United States Patent Office 3,503,990
Patented Mar. 31, 1970

3,503,990
6-ARYL-4,5,6,7-TETRAHYDRO-4-OXOINDOLE
DERIVATIVES
Karl Schoen, Kew Gardens, and Irwin J. Pachter, Woodbury, N.Y., assignors to Endo Laboratories, Inc., Garden City, N.Y., a corporation of New York
No Drawing. Filed Jan. 31, 1967, Ser. No. 612,795
Int. Cl. C07d 27/56, 29/00, 51/00
U.S. Cl. 260—326.12
11 Claims

ABSTRACT OF THE DISCLOSURE

There are provided novel 1-aminoalkyl-6-aryl-4,5,6,7-tetrahydro-4-oxoindoles which are useful as analgetics and anti-tussives. There are also provided methods of preparing these compounds and novel intermediates therefor.

This invention relates to and has for its principal object, the provision of a new class of compounds of the indole series. More particularly, it is concerned with 1-aminoalkyl-6-aryl-4,5,6,7-tetrahydro-4-oxoindoles. It is concerned also with acid addition salts of such compounds. Furthermore, it is concerned with novel 6-aryl-4,5,6,7-tetrahydro-4-oxoindole intermediates used in the preparation of the foregoing 1 aminoalkylated products. It relates also to the synthesis of both intermediates and final products.

The new 1-aminoalkyl-6-aryl-4,5,6,7-tetrahydro-4-oxoindoles of this invention may be chemically represented by structural Formula A

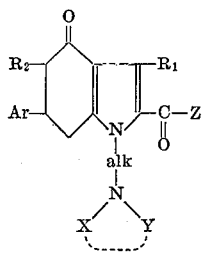

Formula A wherein:

$R_1$ is selected from the group consisting of hydrogen, lower alkyl, lower alkenyl, cycloalkyl, aryl, aralkyl, substituted aryl, substituted aralkyl, heteroaryl and substituted heteroaryl;

$R_2$ is selected from hydrogen, methyl and cyano;

Ar is selected from the group consisting of aryl, heteroaryl, substituted aryl, substituted heteroaryl, cycloalkenyl and cycloalkyl;

Z is selected from the group consisting of lower alkyl, lower alkoxy, amino, substituted amino, saturated heteroamino, phenyl, thienyl and furyl;

Alk is selected from the group of straight and branched chain alkylene radicals having no more than four carbon atoms and a chain of at least two carbon atoms between the two nitrogen atoms, e.g., ethylene, trimethylene, isobutylene and isopropylene;

X and Y designate hydrogen, lower alkyl, lower alkenyl cycloalkyl, hydroxy-lower alkyl, lower acyloxyalkyl, carbamyloxy-lower alkyl, phenyl-lower alkyl, phenyl-lower alkenyl, or when taken together X and Y may be connected to form a heterocyclic ring of not more than eight members such as piperidino, (lower alkyl)piperidino, di(lower alkyl)piperidino, (lower alkoxy) piperidino, hydroxypiperidino, (lower acyloxy)piperidino, pyrrolidino, (lower alkyl)pyrrolidino, (lower alkoxy)pyrrolidino, hydroxypyrrolidino, morpholino, (lower alkyl) morpholino, thiomorpholino, (lower alkyl)thiomorpholino, di(lower alkyl)thiomorpholino, (lower alkoxy)thiomorpholino, piperazino, (lower alkyl)piperazino, di(lower alkyl)piperazino, (lower alkoxy)piperazino, phenylpiperazino, chlorophenylpiperazino, tolylpiperazino, anisylpiperazino, hydroxyalkylpiperazino, lower acyloxylower alkylpiperazino and carbamyloxy-lower alkyl piperazino. The terms "lower acyl," "lower alkyl" and "lower alkoxy" refer to both straight and branched chain and cyclic radicals of no more than six carbon atoms.

$R_1$, situated in the 3-position of the indole ring nucleus, may be hydrogen or a hydrocarbon radical of no more than six carbon atoms. Most advantageous among these compounds are those in which the group $R_1$ bears no more than four carbon atoms. On the other hand, bulky aryl, heteroaryl and aralkyl groups such as phenyl, halophenyl, tolyl, anisyl, thienyl, furyl and benzyl are also highly advantageous.

A critical feature of the compounds of this invention is the presence of an aryl or heteroaryl group in the 6-position of the indole nucleus. Although a hydrogenated group, such as cyclohexenyl, is sufficient to confer useful properties, the best compounds are fully unsaturated. Particularly advantageous are those compounds in which Ar is phenyl, thienyl, furyl, pyridyl, naphthyl or biphenyl. Also advantageous are aromatic groups bearing not more than three substituents chosen from among halogen, lower alkoxy, lower alkylene-dioxy, lower alkyl, lower alkylthio, nitro and haloalkyl. Examples of such groups are isopropylphenyl, dichlorophenyl, bromofuryl, methylenedioxyphenyl and trifluoromethylphenyl.

A further critical feature of the compounds of Formula A is that they bear carbonyl functions at the 2-position of the indole nucleus. A wide variety of carbonyl functions have been found useful including acetyl, dimethylcarboxamido, furoyl, benzoyl, carbomethoxy and carbobutoxy.

Acids useful for preparing the acid addition salts (pharmaceutically acceptable) include inorganic acids such as hydrochloric, hydrobromic, sulfuric, nitric, phosphoric and perchloric acids, as well as organic acids such as oxalic, tartaric, citric, acetic, succinic, maleic and ethane disulfonic acids.

The 1 - aminoalkyl-6-aryl - 4,5,6,7-tetrahydro-4-oxoindoles of this invention are analgetic and anti-tussive compounds of remarkable utility. They are active orally, parenterally and rectally. By the oral route many of the compounds, such as methyl 4,5,6,7-tetrahydro-3-methyl-1 - (2 - dimethylaminoethyl)-4-oxo-6-phenylindole-2-carboxylate and ethyl 4,5,6,7-tetrahydro-4-oxo-3,6-diphenylindole-2-carboxylate, have shown 20 to 40 times the potency of the valuable drug codeine in alleviating experimental pain. The compounds are most frequently administered orally in tablets or capsules, the optimum dosage depending, of course, on the particular compound being used and the severity of the syndromes being treated. In general, however, oral dose levers of preferred compounds in the range of 1.0 to 1000 mg. per day are useful.

Each of the compounds of this invention possesses at least one asymmetric carbon atom (position 6 of the indole nucleus). Some of the compounds possess more than one asymmetric carbon atom. Each compound is therefore capable of being separated into two or more isomeric substances. One isomer may demonstrate valuable anti-tussive properties while its mirror image may be an important analgetic. It is meant, when specific compounds are cited in this invention, to include mixtures of isomers as well as individual optically active substances.

Most of the novel 1-aminoalkyl-6-aryl-4,5,6,7-tetrahydro-4-oxoindoles of this invention are prepared from 6-aryl-4,5,6,7-tetrahydro-4-oxoindoles of Formula B. These useful synthetic intermediates are also novel compounds and are an additional feature of this invention. They are prepared from 5-substituted cyclohexane-1,3-diones and α-oximinocarbonyl compounds under the action of zinc and acetic acid (Knorr synthesis) as illustrated.

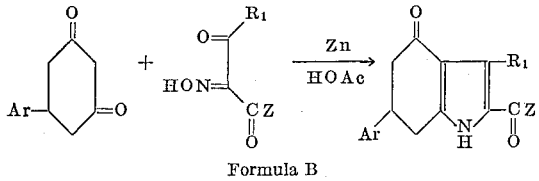

Formula B

Compounds of Formula B, furthermore, may serve as intermediates in the preparation of still other useful intermediates of Formula C. The latter compounds are the result of a Mannich reaction, followed by quaternization and hydrogenation as exemplified.

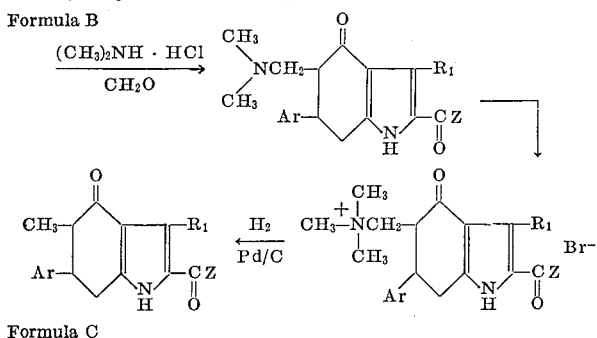

Formula C

The nature of the basic salt involved in the Mannich reaction, the nature of the quaternizing alkyl halide and the nature of the hydrogenation catalyst used in the preparation of compounds of Formula C are not of critical importance to this invention.

The final step in the synthesis of compounds of Formula A involves an aminoalkylation reaction. A compound of Formula B or C is mixed with an anhydrous solvent as, for example, an alkylformamide such as dimethylformamide, diethylformamide and the like, an aromatic hydrocarbon such as benzene, toluene and xylene, an ether such as dioxane, 1,2-dimethoxyethane, tetrahydrofuran, diphenyl ether and the like and dimethyl sulfoxide.

The resulting mixture which is frequently, though not necessarily, a solution is then heated and stirred in an inert atmosphere in the presence of a strongly basic condensing agent such as sodium hydride, potassium hydride, sodamide, an alkyl lithium, an alkali metal alkoxide or an alkaline metal such as lithium, potassium, sodium or calcium.

The resulting metallic derivative of a compound of Formula B or C is then stirred and heated with an appropriate aminoalkyl halide or sulfate to form the final product of Formula A.

The temperature at which the aminoalkylation reaction is conducted is not critical. The reaction may be carried out at 20 to 200°, although in many cases it is convenient to allow the reflux temperature of the reaction medium to determine the reaction temperature.

The sequence is illustrated as follows where M represents an alkaline metal and Q represents halide or sulfate.

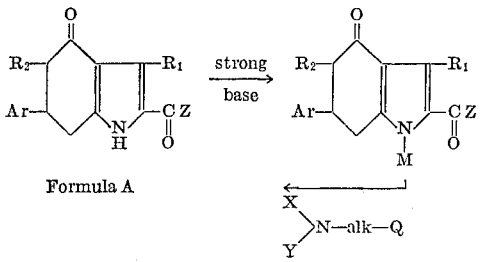

Formula A

In the following examples, weights and measures are given in metric system values and temperatures are set forth in degrees centigrade.

EXAMPLE 1

Ethyl 4,5,6,7 - tetrahydro-3-methyl-1-(2-dimethylaminoethyl)-4-oxo 6 - phenylindole-2-carboxylate hydrochloride To a solution of 130 g. ethyl acetoacetate (1 mole) in 300 ml. acetic acid cooled to 5° was added with efficient stirring a cold saturated aqueous solution of 70 g. sodium nitrite at such a rate that the temperature remained between 5 and 7°. After addition, the solution was stirred at room temperature for one hour to produce ethyl oximinoacetoacetate.

5-phenyl-1,3-cyclohexanedione 188 g. (1 mole) was dissolved in 3 l. acetic acid with slight warming. To the well stirred solution was added the solution of ethyl oximinoacetoacetate. At the same time 200 g. zinc dust was added in small portions. The temperature of the mixture rose spontaneously to 85°. After addition, the mixture was heated under reflux for thirty minutes and poured onto ice. The precipitate was filtered, washed with water, dried and crystallized from isopropanol. Ethyl 4,5,6,7 - tetrahydro-3-methyl-4-oxo-6-phenylindole-2-carboxylate, M.P. 214–215°, was obtained in the form of pale yellow crystals; yield 100 g.

Ethyl 4,5,6,7 - tetrahydro-3-methyl-4-oxo - 6 - phenylindole-2-carboxylate (51 g., 0.17 mole) and 6.65 g. potassium (0.17 g.-atom) were heated in 700 ml. anhydrous dioxane in a nitrogen atmosphere with stirring. The ester went into solution and within a short time the potassium derivative precipitated. To the stirred mixture was added dropwise a solution of 0.22 mole dimethylaminoethyl chloride in 100 ml. toluene. After addition, the mixture was heated under reflux with stirring for two hours. The solution was freed from precipitated potassium chloride by filtration and evaporated to dryness in vacuo. The oily residue was treated with a small volume of ether whereupon it solidified. The free amine was dissolved in hot 2 N hydrochloric acid and on cooling the hydrochloride salt crystallized. It was recrystallized from ethanol, M.P. 239°; yield 50 g. (73% of theory).

EXAMPLE 2

Ethyl 1-(2-diethylaminoethyl)-4,5,6,7-tetrahydro-3-methyl-4-oxo-6-phenylindole carboxylate The potassium derivative of ethyl 4,5,6,7-tetrahydro-3-methyl-4-oxo-6-phenylindole - 2 - carboxylate reacted with 2-diethylaminoethyl chloride under the conditions of Example 1. The free base was purified by crystallization from heptane and melted at 87°.

Resolution with the aid of d-tartaric acid and l-tartaric acid produces the pure- and l-isomers of the product.

EXAMPLE 3

The following compounds were prepared from ethyl 4,5,6,7-tetrahydro - 3 - methyl-4-oxo-6-phenylindole-2-carboxylate and appropriate aminoethyl chlorides by the procedures of Example 1.

Ethyl 4,5,6,7-tetrahydro-3-methyl-4-oxo-6-phenyl-1-(2-piperidinoethyl)indole - 2 - carboxylate, M.P. 135–137°, from piperidinoethyl chloride.

Ethyl 4,5,6,7-tetrahydro-3-methyl-4-oxo-6-phenyl-1-(2-pyrrolidinoethyl)indole - 2 - carboxylate, M.P. 108°, from pyrrolidinoethyl chloride.

Ethyl 4,5,6,7-tetrahydro-3-methyl-1-(2-morpholinoethyl)-4-oxo-6-phenylindole-2-carboxylate, M.P. 148–149°, from morpholinoethyl chloride.

Ethyl 4,5,6,7-tetrahydro-1-(2-diisopropylaminoethyl)-3-methyl-4-oxo-6-phenylindole - 2 - carboxylate, M.P. 107–108.5°, from diisopropylaminoethyl chloride.

Ethyl 1-[2-(N-allyl-N-methylamino)ethyl]-4,5,6,7 - tetrahydro-3-methyl-4-oxo-6 - phenylindole-2-carboxylate hydrochloride, M.P. 140–143°, from N - allyl-N-methyl-aminoethyl chloride.

Ethyl 4,5,6,7-tetrahydro-3-methyl-1-[2-(N-methyl - N-phenylethylamine)ethyl] - 4 - oxo - 6 - phenylindole - 2-carboxylate hydrochloride, M.P. 211–212°, from N-methyl-N-phenylethylaminoethyl chloride.

Ethyl 4,5,6,7-tetrahydro-3-methyl-1 - 2 - [N-methyl-N-(3-phenylpropyl)amino]ethyl - 4 - oxo - 6 - phenylindole-2-carboxylate hydrochloride, M.P. 175–177°, from N-methyl-N-(3-phenylpropyl)-aminoethyl chloride.

Ethyl 1 - [2-(N-cinnamyl-N-methyl)aminoethyl] - 4,5-6,7 - tetrahydro-3-methyl-4-oxo-6-phenylindole - 2 - carboxylate hydrochloride, M.P. 194–195°, prepared from N-cinnamyl-N-methylaminoethyl chloride.

Ethyl 1-(2-aminoethyl)-4,5,6,7-tetrahydro-3-methyl - 4-oxo-6-phenylindole-2-carboxylate, prepared from aminoethyl chloride.

EXAMPLE 4

By the procedures of Example 1, using ethyl 4,5,6,7-tetrahydro-3-methyl-4-oxo-6 - phenylindole-2-carboxylate and a variety of aminoalkyl chlorides, the following were prepared.

Ethyl 4,5,6,7-tetrahydro-3-methyl-1-(3-dimethylaminopropyl)-4-oxo-6-phenylindole-2 - carboxylate, M.P. 104–106°, from 3-dimethylaminopropyl chloride.

Ethyl 4,5,6,7-tetrahydro-3-methyl-1-(2-dimethylaminopropyl)-4-oxo-6-phenylindole-2-carboxylate hydrochloride, M.P. 221–222°, from 2-dimethylaminopropyl chloride.

Ethyl 4,5,6,7-tetrahydro-3-methyl-1-(3-dimethylamino-2 - methylpropyl)-4-oxo-6-phenylindole-2-carboxylate hydrochloride, M.P. 231–233°, from 3 - dimethylamino-2-methylpropyl chloride.

Ethyl 1-(3-diethylaminopropyl)-4,5,6,7 - tetrahydro-3-methyl-4-oxo-6-phenylindole-2-carboxylate hydrochloride, M.P. 160–162°, from 3-diethylaminopropyl chloride.

EXAMPLE 5

Methyl 4,5,6,7-tetrahydro-3-methyl-1-(2-dimethylaminoethyl)-4-oxo-6-phenylindole-2-carboxylate Methyl 4,5,6,7 - tetrahydro-3-methyl-4-oxo-6-phenylindole-2-carboxylate (M.P. 239–241°) was prepared according to Example 1 from methyl oximinoacetoacetate and 5-phenyl-1,3-cyclohexanedione. Reaction of its potassium derivative with dimethylaminoethyl chloride by the procedure of Example 1 gave the compound, M.P. 111–112.5° (from heptane).

In similar fashion diethylaminoethyl chloride reacted with the potassium derivative of methyl 4,5,6,7-tetrahydro-3 - methyl-4-oxo-6-phenylindole-2-carboxylate to produce methyl 1-(2-diethylaminoethyl) - 4,5,6,7 - tetrahydro - 3-methyl-4-oxo-6-phenylindole - 2 - carboxylate, M.P. 122–123.5°.

EXAMPLE 6

Tert.-butyl 1-(2-dimethylaminoethyl)-4,5,6,7-tetrahydro-3-methyl-4-oxo-6-phenylindole-2-carboxylate Condensation of 5 - phenyl-1,3-cyclohexanedione with tert.-butyl oximinoacetoacetate according to Example 1 gave tert.-butyl 4,5,6,7-tetrahydro-3-methyl-4-oxo-6-phenylindole-2-carboxylate, crystals from isopropanol, M.P. 225–226° (decomposition) which, by the procedures of Example 1, afforded the title compound, M.P. 159–160° (from heptane).

EXAMPLE 7

Ethyl 3-ethyl-4,5,6,7-tetrahydro-1-(2-dimethylaminoethyl)-4-oxo-6-phenylindole-2-carboxylate hydrochloride Ethyl 3-ethyl-4,5,6,7-tetrahydro-4-oxo-6-phenylindole-2-carboxylate (M.P. 188–189°) was prepared according to Example 1 from ethyl oximinopropionylacetate and 5-phenyl-1,3-cyclohexanedione. Reaction of the potassium derivative with dimethylaminoethyl chloride gave the compound, M.P. 222–223° (from isopropanol).

EXAMPLE 8

Ethyl 4,5,6,7-tetrahydro-1-(2-dimethylaminoethyl)-4-oxo-6-phenyl-3-propylindole-2-carboxylate Ethyl 4,5,6,7-tetrahydro-4-oxo-6-phenyl-3-propylindole-2-carboxylate (M.P. 162.5–163°) was prepared according to Example 1 from ethyl oximinobutyrylacetate and 5-phenyl-1,3-cyclohexanedione. Reaction of its potassium derivative with dimethylaminoethyl chloride gave the amine, M.P. 98–99° (from heptane).

In similar fashion, ethyl 4,5,6,7 - tetrahydro-4-oxo-6-phenyl-1-(2 - piperidinoethyl)-3-propylindole-2-carboxylate, M.P. 116.5–117.5°, was prepared from piperidinoethyl chloride and ethyl 4,5,6,7-tetrahydro-4-oxo-6-phenyl-3-propyl-1-(2-pyrrolidinoethyl)indole - 2-carboxylate, M.P. 96–97°, was prepared from pyrrolidinoethyl chloride.

EXAMPLE 9

Ethyl 4,5,6,7-tetrahydro-1-(2-dimethylaminoethyl)-4-oxo-3,6-diphenylindole-2-carboxylate Condensation of 5 - phenyl-1,3-cyclohexanedione with ethyl oximinobenzoylacetate gave ethyl 4,5,6,7-tetrahydro-4-oxo-3,6 - diphenylindole-2-carboxylate, M.P. 227°. The latter was alkylated with dimethylaminoethyl chloride by the procedure of Example 1 to yield the product, M.P. 125–126°, upon recrystallization from isopropanol.

Other compounds which are prepared in related fashion are the following:

Ethyl 4,5,6,7-tetrahydro-1-(2-dimethylaminoethyl) - 4-oxo-6-phenyl-3-thienylindole-2-carboxylate.

Ethyl 4,5,6,7-tetrahydro-1-(2-dimethylaminoethyl) - 4-oxo-6-phenyl-3-(3-trifluoromethylphenyl)indole - 2 - carboxylate.

Ethyl 3-(3-chlorophenyl)-4,5,6,7-tetrahydro - 1 - (2-dimethylaminoethyl)-4-oxo-6-phenylindole-2-carboxylate.

Ethyl 3 - (5-bromo-2-furyl)-4,5,6,7-tetrahydro-1-(3-dimethylaminopropyl) - 4 - oxo-6-phenylindole-2-carboxylate.

Ethyl 3-crotyl-4,5,6,7 - tetrahydro-1-(3 - dimethylaminopropyl)-4-oxo-6-phenylindole-2-carboxylate.

Ethyl 4,5,6,7 - tetrahydro-3-(2-methoxyphenyl)-1-(2-dimethylaminoethyl)-4-oxo-6-phenylindole-2-carboxylate.

Ethyl 3-(4-bromobenzyl)-4,5,6,7-tetrahydro-1 - (2 - dimethylaminoethyl)-4-oxo-6-phenylindole-2-carboxylate.

Ethyl 3-cyclohexyl-4,5,6,7-tetrahydro - 1 - (2-dimethylaminopropyl)-4-oxo-6-phenylindole-2-carboxylate.

Ethyl 1-(2-diethylaminoethyl)-4,5,6,7 - tetrahydro - 4-oxo-6-phenyl-3-(3-pyridyl)indole-2-carboxylate.

Ethyl 4,5,6,7-tetrahydro-1-(2-dimethylaminoethyl) - 4-oxo-6-phenyl-3-(4-tolyl)indole-2-carboxylate.

EXAMPLE 10

Ethyl 4,5,5,7-tetrahydro-3-methyl - 1 - (2-dimethylaminoethyl)-4-oxo-6-(2-thienyl - indole - 2 - carboxylate hydrochloride A solution of 23 g. sodium in 400 ml. of anhydrous ethanol was prepared. With stirring, 170 g. diethyl malonate was added followed by 152 g. of α-thenylideneacetone. The mixture was stirred and heated under reflux on the steam bath for 4.5 hours. Then 2.2 mole of sodium hydroxide in 600 ml. of water was added and heating continued for five hours. A small amount of brown material was removed by filtration and the hot solution was made acid to Congo red with concentrated acid (300 ml.). On standing at room temperature, 5-(2-thienyl)-1,3-cyclohexanedione crystallized; the mixture was kept in the refrigerator over night, filtered, washed with water, dried and recrystallized from toluene, then from water; M.P. 148–150°, yield 144 g.=74% of theory.

Condensation of 5 - (2-thienyl)-1,3-cyclohexanedione with ethyl oximinoacetoacetate according to Example 1 afforded ethyl 4,5,6,7-tetrahydro-3-methyl-4-oxo-6-(2-thienyl) indole-2-carboxylate, M.P. 209–210°. Its potassium derivative gave, with dimethylaminoethyl chloride, the compound, M.P. 229–230° (from isopropanol).

By using diethylaminoethyl chloride in the foregoing sequence there was obtained ethyl 1-(2-diethylaminoethyl - 4,5,6,7, - tetrahydro-3-methyl-4-oxo-6-(2-thienyl) indole-2-carboxylate hydrochloride, M.P. 190–191°.

EXAMPLE 11

Ethyl 4,5,6,7-tetrahydro-6-(4-methoxyphenyl)-3-methyl-1 - (2-dimethylaminoethyl)-4-oxoindole-2-carboxylate hydrochloride Reaction of 5-(4-methoxyphenyl)-1,3-cyclohexanedione with ethyl oximinoacetoacetate according to Example 1 gave ethyl 4,5,6,7 - tetrahydro-6-(4-methoxyphenyl)-3-methyl-4-oxoindole - 2 - carboxylate, M.P. 203–203.5° (from isoprapanol). The potassium derivative of the oxoindole reacted with dimethylaminoethyl chloride to afford the compound, M.P. 240–241° (from water).

EXAMPLE 12

Ethyl 4,5,6,7 - tetrahydro - 6 - (2 - methoxyphenyl) - 3-methyl-1-(2-dimethylaminoethyl) - 4 - oxoindole-2-carbonxylate hydrochloride Reaction of 5-(2 - methoxyphenyl)-1,3-cyclohexanedione with ethyl oximinoacetoacetate according to Example 1 gave ethyl 4,5,6,7-tetrahydro-6-(2-methoxyphenyl)-3-methyl-4-oxoindole-2-carboxylate, M.P. 226–228.5° (from acetic acid). Reaction of the potassium derivative from dimethylaminoethyl chloride gave the compound, M.P. 246–247° (from ethanol).

Etheyl 4,5,6,7-tetrahydro - 3 - methyl-1-(2-dimethylaminoethyl)-6-3,-methylenedioxyphenyl - 4 - oxoindole-2-carboxylate is synthesized in related fashion.

EXAMPLE 13

Ethyl 6-(4-chlorophenyl)-1-(2 - dimethylaminoethyl)-4,5,6,7-tetrahydro-3-methyl-4-oxoindole-2-carboxylate Ethyl 6-(4-cholrophenyl)-4,5,6,7-tetrahydro-3-methyl-4-oxoindole-2-carboxylate (M.P. 248–250° from ethanol) was prepared according to Example 1 from 5-(4-chlorophenyl)-1,3-cyclohexanedione, M.P. 197–199°, and ethyl oximinoacetoacetate and reacted in the usual manner with dimethylaminoethyl chloride. The amine was crystallized from benzene, M.P. 126–128°.

In analogous manner methyl oximinoacetoacetate and 5-(4-chlorophenyl) - 1,3 - cyclohexanedione gave methyl 6-(4-chlorophenyl)-4,5,6,7 - tetrahydro-3-methyl-4-oxoindole-2-carboxylate, M.P. 263–265°. Reaction with dimethylaminoethyl chloride gave methyl 6-(4-chlorophenyl)-1-(2-dimethylaminoethyl) - 4,5,6,7 - tetrahydro-3-methyl-4-oxoindole - 2 - carboxylate, M.P. 141–142° (from heptane).

EXAMPLE 14

Ethyl 6-(3,4-dichlorophenyl)-1-(2-dimethylaminoethyl)-4,5,6,7 - tetrahydro-3-methyl-4-oxoindole-2-carboxylate hydrochloride Condensation of 3,4-dichlorobenzalacetone with sodium diethyl malonate according to Example 10 gave 5-(3,4-dichlorophenyl - 1,3 - cyclohexanedione (M.P. 190–192° from isopropanol) which, with ethyl oximinoacetoacetate, gave ethyl 6 - (3,4-dichlorophenyl)-4,5,6,7-tetrahydro-3-methyl-4-oxoindole-2-carboxylate, M.P. 255–256° (from acetic acid). Reaction with dimethylaminoethyl chloride gave the compound which crystallized from ethanol and melted at 226–227°.

In an analogous manner, methyl 6-(3,4-dichlorophenyl)-4,5,6,7 - tetrahydro-3-methyl-4-oxoindole-2-carboxylate (crystals from Cellosolve solvent, M.P. 258–259°) gave the corresponding methyl 6-(3,4-dichlorophenyl)-1-(2-dimethylaminoethyl)-4,5,6,7-tetrahydro - 3-methyl-4-oxoindole - 2 - carboxylate hydrochloride, M.P. 224–225° (from isopropanol).

EXAMPLE 15

Ethyl 1-(2-dimethylaminoethyl)-4,5,6,7-tetrahydro-6-(4-isopropylphenyl)-3-methyl-4-oxoindole - 2 - carboxylate hydrochloride.

Condensation of 4-isopropylbenzalacetone (B.P. 131°/4 mm.) with sodium diethyl malonate according to Example 10 gave 5-(4-isopropylphenyl)-1,3-cyclohexanedione (M.P. 214–216° from toluene). This was reacted with ethyl oximinoacetoacetate to afford ethyl 4,5,6,7-tetrahydro-6-(4-isopropylphenyl) 3 - methyl-4-oxoindole-2-carboxylate (M.P. 229°, from isopranol) which in turn gave, in the usual manner, the title compound, M.P. 200–201° (from isopropanol ether).

The corresponding methyl 4,5,6,7-tetrahydro-6-(4-isopropylphenyl)-3-methyl-4-oxoindole-2-carboxylate (M.P. 236–237°, from ethanol) gave methyl 1-(2-dimethylaminoethyl) - 4,5,6,7-tetrahydro-6-(4-isopropylphenyl)-3 methyl-4-oxoindole-2-carboxylate hydrochloride, crystals from ethanol, M.P. 246°.

EXAMPLE 16

Ethyl 6-(2-furyl)-4,5,6,7-tetrahydro-3-methyl-1-(2-dimethylaminoethyl-4-oxoindole-2-carboxylate Condensation of 5 - (2 - furyl)-1,3-cyclohexanedione with ethyl oximinoacetoacetate according to Example 1 gave ethyl 6-(2-furyl) - 4,5,6,7-tetrahydro-3-methyl-4-oxoindole-2-carboxylate; M.P., upon recrystallization from isopropanol, 188–189°. The potassium derivative reacted with dimethylaminoethyl chloride to give the base, M.P. 82–84° (from cyclohexane).

Ethyl 1 - (2 - diethylaminoethyl)-6-(2-furyl)-4,5,6,7-tetrahydro-3-methyl - 4 - oxoindole-2-carboxylate hydrochloride was prepared in like fashion and melted at 201–203° after recrystallization from isopropanol.

5-bromo - 2 - furylideneacetone yields 5 - (5-bromo-2-furyl)-1,3-cyclohexanedione by the procedure of Example 10 and is converted into ethyl 6 - (5-bromo-2-furyl-4,5,6,7-tetrahydro-3-methyl - 1 - (2-dimethylaminoethyl)-4-oxoindole-2-carboxylate. 5 - bromo-4-isopropyl-2-furylideneacetone is converted similarly into ethyl 6-(5-bromo-4-isopropyl-2-furyl)-4,5,6,7-tetrahydro-3-methyl - 1 - (2-dimethylaminoethyl)-4-oxoindole-2-carboxylate.

Other compounds prepared in related fashion are the following:

Methyl 6-(4-biphenyl)-4,5,6,7 - tetrahydro-3-methyl-1-(2-piperidinoethyl)-4-oxoindole-2-carboxylate.

Ethyl 4,5,6,7-tetrahydro-3-methyl-1-(2-dimethylaminoethyl)-6-(3-pyridyl)-4-oxoindole-2-carboxylate.

Ethyl 4,5,6,7-tetrahydro-3-methyl-1-(2dimethylaminoethyl)-6-(1-naphthyl)-4-oxoindole-2-carboxylate.

EXAMPLE 17

Ethyl 6-(3-cyclohexenyl)-1-(2-dimethylaminoethyl)-4,5,6,7 - tetrahydro-3-methyl - 4 - oxoindole-2-carboxylate hydrochloride Condensation of 1,2,5,6-tetrahydrobenzalacetone (B.P. 104–108°/15 mm.) with sodium diethyl malonate according to Example 10 gave 5-(3-cyclohexenyl)-1,3-cyclohexanedione (m. p. 170–172°, from benzene) which in turn gave, with ethyl oximinoacetoacetate, ethyl 6-(3-cyclohexenyl)-4,5,6,7-tetrahydro-3-methyl - 4 - oxoindole-2-carboxylate (M.P. 220–222°, from ethanol). Reaction with dimethylaminoethyl chloride as in Example 1 gave the title compound, crystals from ethanol, M.P. 241°.

Condensation of 5 - (3-cyclohexenyl)-1,3-cyclohexanedione with methyl oximinoacetoacetate gave methyl 6-(3-cyclohexenyl)-4,5,6,7-tetrahydro-3-methyl - 4 - oxoindole-2-carboxylate (M.P. 217–219° from ethanol) from which methyl 6 - (3 - cyclohexenyl)-1-(2-dimethylaminoethyl)-4,5,6,7-tetrahydro-3-methyl-4-oxoindole - 2 - carboxylate hydrochloride (M.P. 256–257°, from water) was obtained in the usual manner.

EXAMPLE 18

Ethyl 6-cyclohexyl-1-(2 - dimethylaminoethyl)-4,5,6,7-tetrahydro - 3 - methyl-4-oxoindole-2-carboxylate hydrochloride Ethyl 6-(3-cyclohexenyl) - 1 - (2-dimethylaminoethyl)-4,5,6,7-tetrahydro-3-methyl-4-oxoindole-2-carboxylate hydrochloride (9.3 g.) was dissolved in 100 ml. of 50% aqueous ethanol. The mixture hydrogenated in a Parr hydrogenation apparatus at room temperature and 50 lbs./sq./in. pressure in the presence of 10% palladium on charcoal as catalyst. Hydrogenation was complete within 10 minutes. The catalyst was filtered off, the solution brought to dryness in vacuo and the residue crystallized from water to which a few drops dilute hydrochloric acid has been added; M.P. 224°.

EXAMPLE 19

1-(2-dimethylaminoethyl)-4,5,6,7,-tetrahydro-3-methyl-4-oxo-6-phenyl-2-indolyl methyl ketone Condensation of 5-phenyl-1,3-cyclohexanedione with oximino-2,4-pentanedione according to Example 1 gave 4,5,6,7-tetrahydro - 3 - methyl-4-oxo-6-phenyl - 2 - indolyl methyl ketone, M.P. 222–223° (from ethanol). The potassium derivative was prepared and allowed to react with dimethylaminoethyl chloride to give the title compound, M.P. 118–119° (from cyclohexane).

EXAMPLE 20

1-(2-dimethylaminoethyl)-3-ethyl-4,5,6,7-tetrahydro-4-oxo-6-phenyl-2-indolyl ethyl ketone Condensation of 5-phenyl-1,3-cyclohexanedione with oximinodipropionylmethane according to Example 1 gave ethyl 3 - ethyl-4,5,6,7-tetrahydro-4-oxo-6-phenyl-2-indolyl ketone, M.P. 204–204.5° (from isopropanol), which gave the title compound, M.P. 104–106° (from heptane), after reaction with dimethylaminoethyl chloride.

When diethylaminoethyl chloride was used, the corresponding 1-(2-diethylaminoethyl) derivative was obtained in the form of its hydrochloride, M.P. 184–185° (from isopropanol).

EXAMPLE 21

1-(2-dimethylaminoethyl)-4,5,6,7-tetrahydro-3-methyl-4-oxo-6-phenyl-2-indolyl phenyl ketone hydrochloride Ethyl 4,5,6,7-tetrahydro-3-methyl-4-oxo - 6 - phenylindole-2-carboxylate (Example 1) 29.7 g. (0.1 mole) was refluxed for 1.5 hours with a mixture of 150 ml. N NaOH and 150 ml. ethanol, the cooled solution was acidified to Congo red with 2 N HCl the precipitated carboxylic acid filtered, washed with water, dried and crystallized from acetic acid, M.P. 234–235° (decomposition); yield 26.8 g.=100% of theory. Heating of the acid above its melting point in an oil bath gave 4,5,6,7-tetrahydro-3-methyl-4-oxo-6-phenylindole; M.P. 164–167° (from toluene), yield 100% of theory. Condensation with benzoyl chloride and AlCl₃ according to Friedel-Crafts in chloroform gave 4,5,6,7-tetrahydro-3-methyl-4-oxo-6-phenyl-2-indolyl phenyl ketone, M.P. 211–212° (from Cellosolve solvent). The potassium derivative, with dimethylaminoethyl chloride, afforded the title compound M.P. 246–250° (from isopropanol).

In similar fashion, 4,5,6,7-tetrahydro-3-methyl-4-oxo-6-phenylindole is converted into 2-furyl 4,5,6,7-tetrahydro-4-oxo-6-phenyl-3-furoyl chloride and thence into 2-furyl 4,5,6,7-tetrahydro-3-methyl-1-(2-dimethylaminoethyl) - 4 - oxo-6-phenyl-2-indolyl ketone with 2-furoyl chloride. Also in like fashion, through use of thenoyl chloride, 4,5,6,7-tetrahydro-3-methyl-1-(2-dimethylaminoethyl) - 4 - oxo - 6 - phenyl-2-indolyl - 2 - thienyl ketone is produced.

EXAMPLE 22

1-(2-dimethylaminoethyl)-4,5,6,7-tetrahydro - 3 -methyl-4-oxo-6-phenylindole - 2 - dimethylcarboxamide hydrochloride Condensation of 5-phenyl-1,3-cyclohexanedione with oximinodimethylacetoacetamide according to Example 1 gave 4,5,6,7-tetrahydro-3-methyl-4-oxo-6-phenylindole-2-dimethylcarboxamide, colorless crystals from chlorobenzene, M.P. 204–204.5°. The potassium derivative was allowed to react with dimethylaminoethyl chloride to yield the title compound, M.P. 234–235° (from ethanol).

Through use of oximinoacetoacetpiperidide in place of oximinodimethylacetoactamide there is produced 4,5,6,7-tetrahydro-3-methyl-4-oxo - 6 - phenylindole - 2 - carboxypiperidide.

EXAMPLE 23

1-(2-dimethylaminoethyl)-4,5,6,7-tetrahydro-3-methyl-4-oxo-6-phenylindole-2-(N-benzyl)carboxamide Condensation of 5-phenyl-1,3-cyclohexanedione with oximinoacetoacetbenzylamide according to Example 1 gave 4,5,6,7-tetrahydro-3-methyl-4-oxo-6-phenylindole-2-(N-benzyl)carboxamide, M.P. 268–269.5° (from acetic acid). The corresponding potassium derivative reacted with dimethylaminoethyl chloride gave the title compound, M.P. 169–171° (from isopropanol).

EXAMPLE 24

Ethyl 4,5,6,7-tetrahydro-3,5-dimethyl-1-(2-dimethylaminoethyl)-4-oxo-6-phenylindole-2-carboxylate Ethyl 4,5,6,7-tetrahydro-3-methyl-4-oxo-6-phenylindole-2-carboxylate (15 g.), 10 g. of dimethylamine hydrochloride and 5 g. of paraformaldehyde were heated in 100 ml. of acetic acid on a steam bath for eight hours. The solution was diluted with 400 ml. of water, kept one hour at room temperature, filtered to remove a small quantity of insoluble material and made alkaline with aqueous ammonia. A resinous precipitate formed which solidified on standing. It was filtered, washed with water until neutral, then redissolved in dilute hydrochloric acid, filtered and made alkaline with aqueous ammonia. Crystalline ethyl 4,5,6,7-tetrahydro-3-methyl-5-dimethylaminomethyl-4-oxo-6-phenylindole - 2 - carboxylate separated. The hydrochloride, purified by recrystallization from isopropanol, melted at 203–204.5°.

The Mannich base was dissolved in acetone and treated with gaseous methyl bromide. The methobromide salt crystallized. It was collected by filtration and shaken with ethanol and hydrogen in the presence of 10% palladium on charcoal to produce ethyl 4,5,6,7-tetrahydro-3,5-dimethyl-4-oxo-6-phenylindole-2-carboxylate. The latter was converted into the potassium derivative and treated with dimethylaminoethyl chloride to produce the desired product, M.P. 142°.

EXAMPLE 25

Ethyl 5-cyano-4,5,6,7-tetrahydro-3-methyl-1-(2-dimethylaminoethyl)-4-oxo-6-phenylindole-2-carboxylate hydrochloride Condensation of 4-cyano-5-phenyl-1,3-cyclohexanedione with ethyl oximinoacetoacetate according to Example 1 gave ethyl 5-cyano-4,5,6,7-tetrahydro-3-methyl-4-oxo-6-phenylindole-2-carboxylate; M.P. 240–243° (from acetic acid). Reaction of the potassium derivative with dimethylaminoethyl chloride gave the title compound, M.P. 252–253° (from methanol-ether).

EXAMPLE 26

Ethyl 3-butyl-1-(2-dimethylaminoethyl)-4,5,6,7-tetrahydro-4-oxo-6-phenylindole-2-carboxylate hydrochloride To a solution of 149 g. ethyl β-oxonenanthate in 300 ml. acetic acid was added with cooling and stirring a solution of 61 g. sodium nitrite in 120 ml. at such a rate that the temperature remained at 8° or below. After addition the mixture was stirred at room temperature for one hour and then added gradually to a solution of 163 g. 5-phenyl-1,3-cyclohexanedione in 2500 ml. acetic acid at 50°. At the same time, 180 g. zinc dust was added in portions. The temperature rose spontaneously to 85° and the mixture was then stirred and heated under reflux for one hour. After pouring onto ice, collecting the precipitate on a filter, washing with water, drying and crystallizing from ethanol, there was obtained ethyl 3-butyl-4,5,6,7-tetrahydro-4-oxo - 6 - phenylindole-2-carboxylate, M.P. 144–146°. Reaction of the potassium derivative with dimethylaminoethyl chloride gave the title compound isolated as the hydrochloride salt, M.P. 230°.

EXAMPLE 27

Ethyl 1-(2-dimethylaminoethyl)-4,5,6,7-tetrahydro-6-(2-methoxyphenyl)-4-oxo-3-phenylindole-2-carboxylate Ethyl oximinobenzoylacetate was prepared from 148 g. ethyl benzoylacetate in 1200 ml. acetic acid and 54 g. sodium nitrite in 100 ml. water and the solution was added gradually to a solution of 168 g. of 5-(2-methoxyphenyl)-1,3-cyclohexanedione in 1200 ml. acetic acid at 50° with stirring and simultaneous addition of 160 g. zinc dust. The temperature rose spontaneously to 80° and after addition, the mixture was refluxed for 40 minutes, poured on ice, the precipitate collected on a filter, washed with water, dried and crystallized from Cellosolve solvent to give 60 g. of ethyl 4,5,6,7-tetrahydro-6-(2-methoxyphenyl)-4-oxo-3-phenylindole - 2 - carboxylate, M.P. 213–215°. The potassium derivative was reacted in the usual way with dimethylaminoethyl chloride to give the title compound isolated as the hydrochloride salt, M.P. 236–237°.

EXAMPLE 28

Ethyl 1-(2-dimethylaminoethyl)-4,5,6,7-tetrahydro-4-oxo-3-phenyl-6-(2-thienyl)-indole-2-carboxylate Reaction of ethyl oximinobenzoylacetate with 5-(2-thienyl)-1,3-cyclohexanedione analogs to Example 27 gave ethyl 4,5,6,7 - tetrahydro - 4 - oxo-3-phenyl-6-(2-thienylindole)-2-carboxylate, M.P. 217–218°. The potassium derivative when reacted in the usual manner with dimethylaminoethyl chloride the title compound which was isolated as the hydrochloride salt. The latter crystallized from isopropanol as the hemihydrate, M.P. 250°.

EXAMPLE 29

Ethyl 4,5,6,7-tetrahydro-4-oxo-3,6-diphenyl-1-(2-pyrrolidinoethyl)indole-2-carboxylate hydrochloride Prepared according to Example 9 from the potassium derivative of ethyl 4,5,6,7 - tetrahydro - 4 - oxo-3,6-diphenylindole-2-carboxylate and pyrrolidinoethyl chloride, M.P. 242–246°.

EXAMPLE 30

Ethyl 1-(2-dimethylaminoethyl)-4,5,6,7-tetrahydro-6-(4-isopropylphenyl)-4-oxo-3-phenylindole-2-carboxylate Condensation of ethyl oximinobenzoylacetate with 5-(4-isopropylphenyl)-1,3 - cyclohexanedione according to Example 27 gave ethyl 4,5,6,7 - tetrahydro - 6 - (4-isopropylphenyl) - 4-oxo-3-phenylindole - 2 - carboxylate, M.P. 236–237°, the potassium derivative of which afforded, with dimethylaminoethyl chloride, the title compound, M.P. 122–124°.

EXAMPLE 31

Ethyl 4,5,6,7-tetrahydro-3,5-dimethyl-4-oxo-6-phenyl-1-(2-pyrrolidinoethyl)indole-2-carboxylate Prepared according to Example 24 from the potassium derivative of ethyl 4,5,6,7 - tetrahydro - 3,5 - dimethyl-4-oxo-6-phenylindole - 2 - carboxylate and pyrrolidinoethyl chloride, M.P. 149–151°.

EXAMPLE 32

Ethyl 1-(2-hexamethyleneiminoethyl)-4,5,6,7-tetrahydro-4-oxo-3,6-diphenylindole-2-carboxylate Prepared according to Example 9 from ethyl 4,5,6,7-tetrahydro - 4 - oxo - 3,6 - diphenylindole-2-carboxylate and hexamethyleneiminoethyl chloride, M.P. 158–159°.

Ethyl 1-(2-heptamethyleneiminoethyl) - 4,5,6,7 - tetrahydro - 4 - oxo - 3,6 - diphenylindole - 4 - carboxylate is prepared in related fashion.

EXAMPLE 33

Ethyl 1-(2-dimethylaminoethyl)-4,5,6,7-tetrahydro-6-(3-methoxyphenyl)-3-methyl-4-oxoindole-2-carboxylate Condensation of ethyl malonate and 3-methoxybenzalacetone according to Example 10 gave 5-(3 - methoxyphenyl) - 1,3 - cyclohexanedione, M.P. 127–132°. Reaction of the latter with ethyl oximinoacetonacetate gave ethyl 4,5,6,7 - tetrahydro - 6 - (3 - methoxyphenyl)-3-methyl-4-oxoindole-2-carboxylate, M.P. 189°. The potassium derivative when reacted with dimethylaminoethyl chloride afforded the title compound, M.P. 98–100°.

EXAMPLE 34

Ethyl 1-(2-dimethylaminoethyl)-4,5,6,7-tetrahydro-6-(3-methoxyphenyl)-4-oxo-3-phenylindole-2-carboxylate Reaction of ethyl oximinobenzoylacetate with 5-(3-methoxyphenyl) - 1,3 - cyclohexanedione according to Example 27 gave ethyl 4,5,6,7 - tetrahydro-6-(3-methoxyphenyl) - 4 - oxo - 3 - phenylindole - 2-carboxylate, M.P. 202–204°. Reaction of the potassium derivative with dimethylaminoethyl chloride gave the title compound isolated as the hydrochloride salt, M.P. 253–255°.

EXAMPLE 35

Ethyl 3-benzyl-1-(2-dimethylaminoethyl)-4,5,6,7-tetrahydro-4-oxo-6-phenylindole-2-carboxylate Ethyl oximino-γ-phenylacetoacetate was prepared according to Example 26 from ethyl γ-phenylacetoacetate and reacted with 5 - phenyl-1,3-cyclohexanedione to give ethyl 3-benzyl-4,5,6,7-tetrahydro - 4 - oxo-6-phenylindole-2-carboxylate. The potassium derivative of the latter was reacted with dimethylaminoethyl chloride to give the title compound.

When the potassium derivative was reacted with piperidinoethyl chloride there was obtained ethyl 3-benzyl-4,5,6,7 - tetrahydro - 4 - oxo - 6 - phenyl-1-(2-piperidinoethyl)-indole-2-carboxylate.

In a similar way there were obtained ethyl 3-benzyl-4,5,6,7 - tetrahydro - 1 - (2-morpholinoethyl) - 4 - oxo-6-phenylindole - 2 - carboxylate and ethyl 3-benzyl-4,5,6,7-tetrahydro - 4 - oxo - 6 - phenyl - 1 - (2-pyrrolidinoethyl)-indole-2-carboxylate.

We claim:

1. A compound selected from the group consisting of bases of Formula A and salts thereof with pharmaceutically acceptable acids.

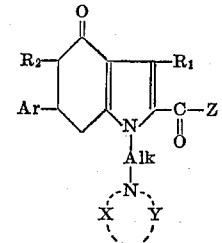

Formula A wherein:

$R_1$ is selected from the group consisting of hydrogen, lower alkyl, lower alkenyl, cycloalkyl of not more than six carbon atoms, phenyl, phenyl lower alkyl, substituted phenyl, and substituted phenyl lower alkyl, in which the aromatic ring is monosubstituted by halogen, lower alkyl of not more than four carbon atoms, lower alkoxy of not more than four carbon atoms or halogenated alkyl of not more than four carbon atoms;

$R_2$ is selected from the group consisting of hydrogen, methyl and cyano;

Ar is selected from the group consisting of phenyl, tetrahydrophenyl, hexahydrophenyl, thienyl, furyl, pyridyl, substituted phenyl, substituted thienyl, substituted furyl, substituted pyridyl, in which the substituted aromatic ring system bear not more than two substituents selected from the group consisting of halogen, lower alkoxy of not more than four carbon atoms, lower alkylenedioxy of not more than four carbon atoms, lower alkyl of not more than four carbon atoms, and haloalkyl;

Z is selected from the group consisting of lower alkyl, lower alkoxy, substituted amino wherein the substituent is lower alkyl, phenyl lower alkyl, piperidino, and phenyl;

Alk is selected from the group of straight and branched chain alkylene radicals having from two to four carbon atoms;

X and Y designate hydrogen, lower alkyl, lower alkenyl, phenyl-lower alkyl, phenyl-lower alkenyl, or when taken together X and Y may be connected to form a heterocyclic ring of not more than eight members selected from the group consisting of: piperidino, pyrrolidino, morpholino, thiomorpholino, hexamethyleneimino and heptamethyleneimino, and wherein "lower alkyl" is a straight branched or cyclic radical of no more than six carbon atoms.

2. A compound in accordance with claim 1 in which $R_1$ is an alkyl group of not more than six carbon atoms, $R_2$ is hydrogen, "alk" is a straight or branched chain alkylene radical having a chain of two carbon atoms between nitrogen atoms and Z is lower alkoxy of not more than eight carbon atoms.

3. A compound in accordance with claim 1 in which $R_1$ is phenyl or substituted phenyl, $R_2$ is hydrogen, alk is a straight or branched chain alkylene radical having a chain of two carbon atoms between nitrogen atoms and Z is lower alkoxy of not more than eight carbon atoms.

4. A compound in accordance with claim 1 wherein Formula A designates ethyl 4,5,6,7-tetrahydro-3-methyl-1-(2-dimethylaminoethyl)-4-oxo-6-phenylindole - 2 - carboxylate.

5. A compound in accordance with claim 1 wherein Formula A designates methyl 4,5,6,7-tetrahydro-3-methyl-1-(2-dimethylaminoethyl)-4-oxo-6-phenylindole - 2 - carboxylate.

6. A compound in accordance with claim 1 wherein Formula A designates ethyl 4,5,6,7-tetrahydro-4-oxo-6-phenyl-3-propyl-1-(2-pyrrolidinoethyl)indole - 2-carboxylate.

7. A compound in accordance with claim 1 wherein Formula A designates ethyl 4,5,6,7-tetrahydro-1-(2-dimethylaminoethyl) - 4-oxo-3,6-diphenylindole-2-carboxylate.

8. A compound in accordance with claim 1 wherein Formula A designates ethyl 4,5,6,7-tetrahydro-3-methyl-1 - (2 - dimethylaminoethyl)-4-oxo-6-(2-thienyl)indole-2-carboxylate.

9. A compound in accordance with claim 1 wherein Formula A designates ethyl 6-(4-chlorophenyl)-1-(2-dimethylaminoethyl)-4,5,6,7-tetrahydro - 3 - methyl-4-oxoindole-2-carboxylate.

10. A compound in accordance with claim 1 wherein Formula A designates ethyl 4,5,6,7-tetrahydro-1-(2-dimethylaminoethyl)-6 - (4 - isopropylphenyl)-3-methyl-4-oxoindole-2-carboxylate.

11. A compound in accordance with claim 1 wherein Formula A designates ethyl 4,5,6,7-tetrahydro-3,5-dimethyl-1-(2-dimethylaminoethyl) - 4 - oxo-6-phenylindole-2-carboxylate.

References Cited

UNITED STATES PATENTS 3,290,332  12/1966  Remers et al. _____ 260—326.12

ALEX MAZEL, Primary Examiner

J. A. NARCAVAGE, Assistant Examiner

U.S. Cl. X.R.

260—243, 247.1, 247.2, 247.5, 268, 293.4, 294.7, 294.8, 294.9, 295, 296, 326.13, 326.14, 326.15, 326.16; 424—246, 248, 250, 263, 267, 274